US008011257B2

(12) United States Patent
Kneucker et al.

(10) Patent No.: US 8,011,257 B2
(45) Date of Patent: Sep. 6, 2011

(54) MULTICHANNEL PIPETTE

(75) Inventors: Ottmar Kneucker, Helmstadt (DE); Michael Ertl, Wertheim (DE)

(73) Assignee: Brand GmbH + Co KG, Wertheim (DE)

( * ) Notice: Subject to any disclaimer, the term of this patent is extended or adjusted under 35 U.S.C. 154(b) by 881 days.

(21) Appl. No.: 12/024,554

(22) Filed: Feb. 1, 2008

(65) Prior Publication Data

US 2008/0184823 A1 Aug. 7, 2008

(30) Foreign Application Priority Data

Feb. 2, 2007 (DE) ......................... 10 2007 006 076

(51) Int. Cl.
*G01N 1/14* (2006.01)

(52) U.S. Cl. .................................................... 73/864.17

(58) Field of Classification Search ........................ None
See application file for complete search history.

(56) References Cited

U.S. PATENT DOCUMENTS

| | | | | |
|---|---|---|---|---|
| 4,215,092 | A * | 7/1980 | Suovaniemi et al. | 73/863.32 |
| 4,779,467 | A | 10/1988 | Rainin et al. | |
| 5,021,217 | A | 6/1991 | Oshikubo | |
| 2007/0048193 | A1 | 3/2007 | Wilmer | |
| 2008/0199361 | A1* | 8/2008 | Gomes et al. | 422/100 |

FOREIGN PATENT DOCUMENTS

| | | |
|---|---|---|
| DE | 198 26 065 A1 | 12/1999 |

OTHER PUBLICATIONS

Operating Manual Brand GMBH + CO KG, Transferpette—8/-12, Feb. 2, 2006, pp. 1,3-37.

Eppendorf Research Instruction Manual, pp. 1-19, 80-96 and 114-116, B 3111 900.158-01/0807, Printed in Germany, 2007.

* cited by examiner

*Primary Examiner* — Robert R Raevis

(74) *Attorney, Agent, or Firm* — Roberts Mlotkowski Safran & Cole, P.C.; David S. Safran

(57) ABSTRACT

A multichannel pipette, including a grip part defining a longitudinal axis and including a piston-driving device movable axially thereon, a displacement part rotating about the axis and having cylinder and piston arrangements, and a connection device for detachably connecting the grip part to the displacement part and permitting a rotation of the displacement about the longitudinal axis. The connection device includes threaded connection elements engaged with one another. The pistons move axially to the cylinders via a piston-driving device. A connection part of the threaded elements is axially connected with the cylinders and includes a clearance for a rotary bearing provided therein. Form-fit configurations on the support and connection parts are engaged to prevent a reverse rotation of the connection part relative to the support part. By a manual release action, the form-fit configurations disengage, such that the connection part rotates in a reverse rotation relative to the support part.

22 Claims, 6 Drawing Sheets

MULTICHANNEL PIPETTE

BACKGROUND OF THE INVENTION

1. Field of Invention

The present invention generally relates to pipettes, and more particularly to an improved multichannel pipette.

2. Description of Related Art

A known multichannel pipette, for example, as described in U.S. Pat. No. 5,021,217, is designed as a hand-held unit, and is actuated by hand. Multichannel pipettes that are hand-held, but that are actuated by a motor have also been disclosed, for example, as described in U.S. Pat. No. 4,779,467.

SUMMARY OF THE INVENTION

A multichannel pipette generally includes a plurality of cylinder/piston arrangements, for example, in order to dose quantities simultaneously into the wells of microtiter plates. Multichannel pipettes with eight channels or twelve channels are particularly common, because the most common microtiter plates are ones with 96 (8×12) wells.

The cylinder/piston arrangements are disposed alongside one another in the displacement part. The cylinders of the cylinder/piston arrangements are joined as a block. The pistons of the cylinder/piston arrangements are also joined, namely with a common piston drive.

Multichannel pipettes are mostly designed as air displacement pipettes. Columns of air are displaced by the cylinder/piston arrangements in such a way that specimen liquid can be suctioned into and discharged from exchangeable pipette tips, which can be fitted onto shafts of the cylinders and which are generally made of plastic and designed as disposable parts. Only the pipette tips come into contact with the liquid.

In principle, however, direct-displacement multichannel pipettes are also known.

Multichannel pipettes can have non-adjustable or adjustable dosing volumes in the cylinder/piston arrangements. A change in the dosing volumes is obtained by adjusting the travel of the piston-driving device in the grip part.

Many functions can be integrated in motor-driven multichannel pipettes, for example, as described in U.S. Pat. No. 4,779,467, including repeated dispensing of small amounts of the liquid.

The displacement part of a multichannel pipette, in which part the several cylinder/piston arrangements are located alongside one another, and to a considerable extent transverse to the longitudinal axis of the grip part. The displacement part basically acts as a broad plate from which the pipette tips disposed alongside one another protrude downward. Depending on how a user holds the grip part during the pipetting operation, the user's view of the microtiter plate may be obstructed by the orientation of the displacement part. It is therefore advantageous to mount the displacement part such that it can rotate relative to the grip part about the longitudinal axis of the grip part. However, to ensure that the displacement part does not undesirably move too easily relative to the grip part, it is advantageous that the rotation be braked in some way, either by friction or notching.

The displacement part must also be able to be removed from the grip part. A connection device serves for the detachable connection of the displacement part to the grip part. A magnetic connection between grip part and displacement part is described in German Patent Application DE-A-198 26 065. However, a screw connection, for example, as described in U.S. Pat. Nos. 4,779,467 and 5,021,217, is more common.

In known multichannel pipettes, the displacement part can rotate relative to the grip part steplessly with friction braking. The engaging threaded elements have a friction that is greater than the friction in the rotary bearing of the displacement part. In this way, the threaded elements normally remain in engagement with one another, even upon rotation of the displacement part relative to the grip part.

To unscrew the displacement part from the grip part, the rotary bearing is blocked by a manual release action, such that a rotation of the displacement part is then transmitted to the connection part. The manual release action is executed by actuation of an axially movable ejection mechanism for the pipette tips. By depressing an ejection button of the ejection mechanism, the blocking of the rotary bearing is freed.

Modern multichannel pipettes should be able to be completely autoclaved in the assembled state. In this process, they are exposed to temperatures of over 120° C., wherein the threads formed in plastic parts lose some of their pretensioning. A threaded connection that is loosened by the autoclaving may come undone upon subsequent orientation of the displacement part relative to the grip part, because the friction suitable for the thread has become less than the friction in the rotary bearing.

If a threaded connection has been loosened by autoclaving or by other means, stroke and measuring errors arise even in the event of very slight rotary movements, for example, when lifting the pipette tips from a rack. This often goes unnoticed by the user. Even a warning in the operating instructions cannot normally always help.

The object of the invention is therefore to improve the known multichannel pipette with regard to its susceptibility to error during operation, taking particularly into account the circumstances that arise during autoclaving.

Accordingly, the above and other objects are met by the features of the exemplary multichannel pipette, wherein the threaded elements of the threaded connection between the support part of the grip part and the connection part are supplemented by a form-fit blocking provided by matching form-fit configurations, which engage with one another in the end position of the thread, so that the displacement part is secured in the intended position on the grip part. With this feature, a reverse rotation of the connection part relative to the support part is definitively prevented. The thread thus remains in stable engagement independently of the friction that exists between the threaded elements and that may possibly have been reduced by repeated autoclaving. This positive form-fit blocking of the threaded connection of grip part and displacement part can be released by a manual release action, such that the displacement part can be rotated about the longitudinal axis relative to the grip part even against a comparatively high braking force, without affecting the engagement of the threaded elements. The position of the piston-driving device relative to the coupled pistons of the cylinder/piston arrangements thus also remains unchanged, and the piston stroke does not change.

Some of the terms used within the context of the teachings of the present invention, include:

The longitudinal axis, which the grip part forms in its orientation relative to the displacement part, hereinafter defines the "axial" direction of the multichannel pipette.

The piston-driving device in the grip part can be a hand-actuated device or a motor-actuated device, as previously described.

In the displacement part, the several cylinder/piston arrangements disposed alongside one another can also be disposed not just in one direction, that is to say along a tranverse axis, but also in two directions, in further embodiments of the invention.

The rotatable bearing of the displacement part on the connection part will already have a certain inherent friction. This can be strengthened and adjusted to a defined value by an integrated friction brake, by a ratchet brake, for example, with an adjustability in mostly equidistant notching steps, or by a combination of both brake types.

The support part of the grip part, which carries the threaded connection element of the connection device, can also be an integral component of a body of the grip part and does not have to be a separate structural part.

The connection part with the coupled cylinders of the cylinder/piston arrangement forms the abutment for the pistons driven by the piston-driving device in the grip part. Here, an axially precise connection is employed in order to minimize the error in the stroke of the piston-driving device. However, the term “axially fixed connection” does not exclude the possibility of a slight axial play being present in the rotary bearing.

The form-fit configurations can have any suitable shape. They will be in engagement with one another when the threaded elements are completely engaged, so that in this definitive end position, a reverse rotation of the connection part relative to the support part is prevented. However, the engagement of the form-fit configurations will generally occur shortly before the end position of the threaded elements is reached, so that threaded elements are “substantially completely engaged.”

In the novel multichannel pipette, the rotary bearing of the displacement part is designed such that it can be blocked. Specifically, it can be blocked by the manual release action, which disengages the form-fit configurations from one another. Then, by gripping the displacement part, it is possible to rotate the connection part and thus release its threaded connection to the grip part.

In further embodiments of the form-fit configurations, an asymmetrical, sawtooth-shaped design of the form-fit configurations is provided, which together then form a kind of asymmetrical wedge mechanism, leading to what may also be an acoustically perceptible ratchet effect, which signals to the user that the end position of the threaded elements has been safely reached. In this case, it is not necessary that the shapes of the form-fit configurations, which engage one another, are identical. For example, different numbers of form-fit configurations can be arranged on the two involved parts of the multichannel pipette.

In further embodiments of the manual release action for the form-fit configurations, the additional catch element, which is assigned in particular to the connection part, but can be moved relative to the latter between two positions, forms an advantageous means of implementing the release action.

It is also advantageous, in the multichannel pipette, for an axially movable ejection mechanism to be provided on the grip part. The axially movable ejection mechanism forms a well-tried means of also achieving the manual release action desired according to the invention for the form-fit configurations. In particular, the catch element can be moved axially by means of the ejection mechanism.

Further embodiments provide the interaction of the ejection mechanism with an outer housing of the displacement part of the multichannel pipette, wherein the outer housing is pretensioned against the grip part by a spring force. The outer housing itself is thus part of the force chain running from the ejection mechanism to the pipette tips at the bottom of the displacement part. In this way, the outer housing can also be used as part of the force chain running from the ejection mechanism to the catch element.

A particularly advantageous embodiment of the catch element is further realized by rotation-transmission ribs and rotation-transmission grooves with radially inward or radially outward orientations, depending on the construction.

Thermoplastic can be employed for most parts of the multichannel pipette. Polypropylene reinforced by minerals can be used. However, ABS, polycarbonates, or the like, also can be used. In the final analysis, chemical resistance, injection-moldability and temperature resistance play the decisive role in the choice of suitable plastics. As noted above, the multichannel pipette can be autoclaved in an assembled state.

The invention is explained in more detail below, with reference to drawings that show preferred and nonlimiting illustrative embodiments.

DETAILED DESCRIPTION OF THE INVENTION

Figure 1:
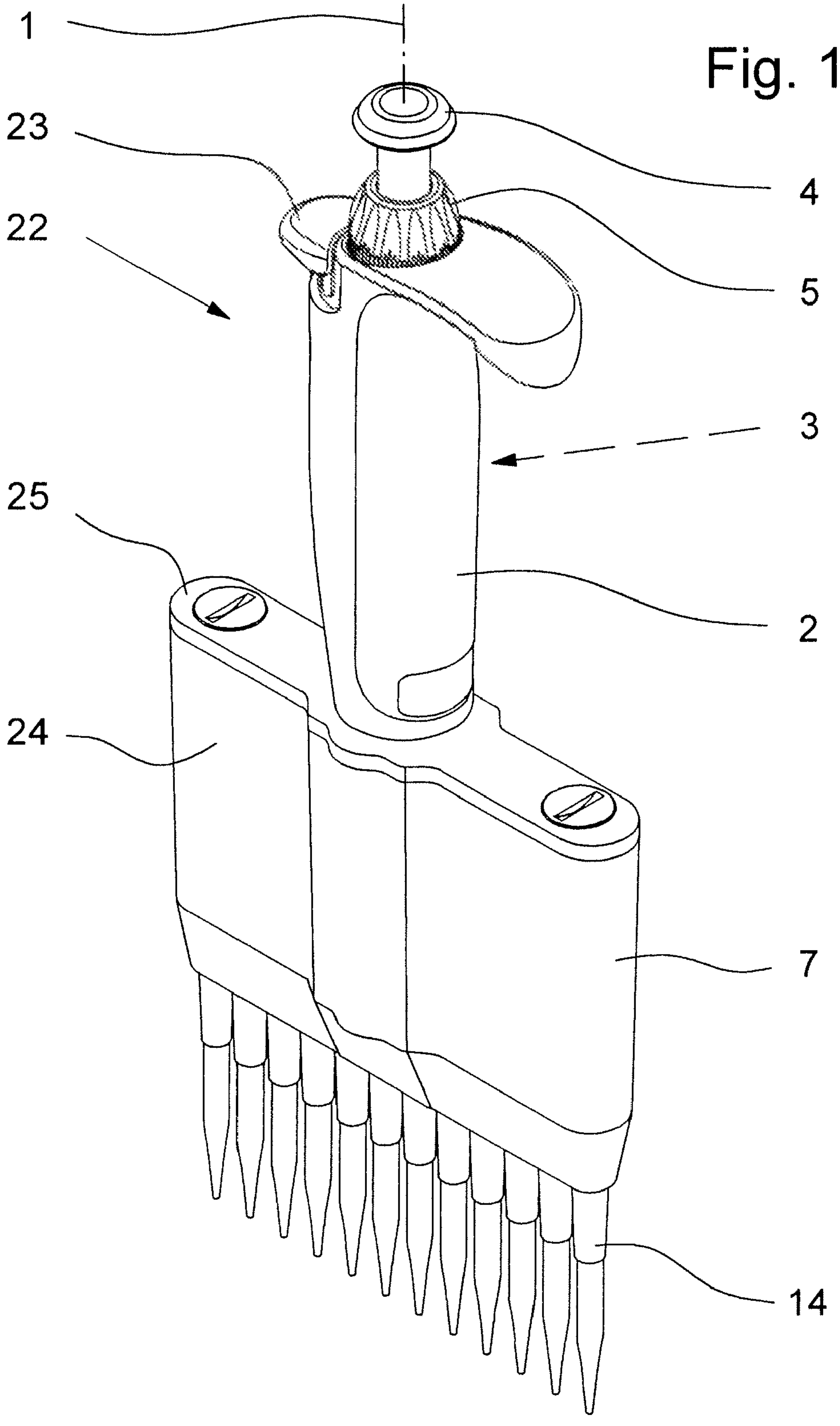
FIG. 1 shows a perspective view of a preferred illustrative embodiment of a multichannel pipette.

FIG. 1 of the drawing shows a perspective view of a multichannel pipette, including a grip part 2 that structurally defines a longitudinal axis 1. The grip part 2 in turn includes a piston-driving device 3, which is movable in the longitudinal direction of the longitudinal axis 1, also referred to as axially. The piston-driving device 3 is located in the interior of the grip part 2 and includes an actuation button 4, and an adjustment element 5 for adjusting the volumes that are to be pipetted by depressing the actuation button 4.

Figure 2:
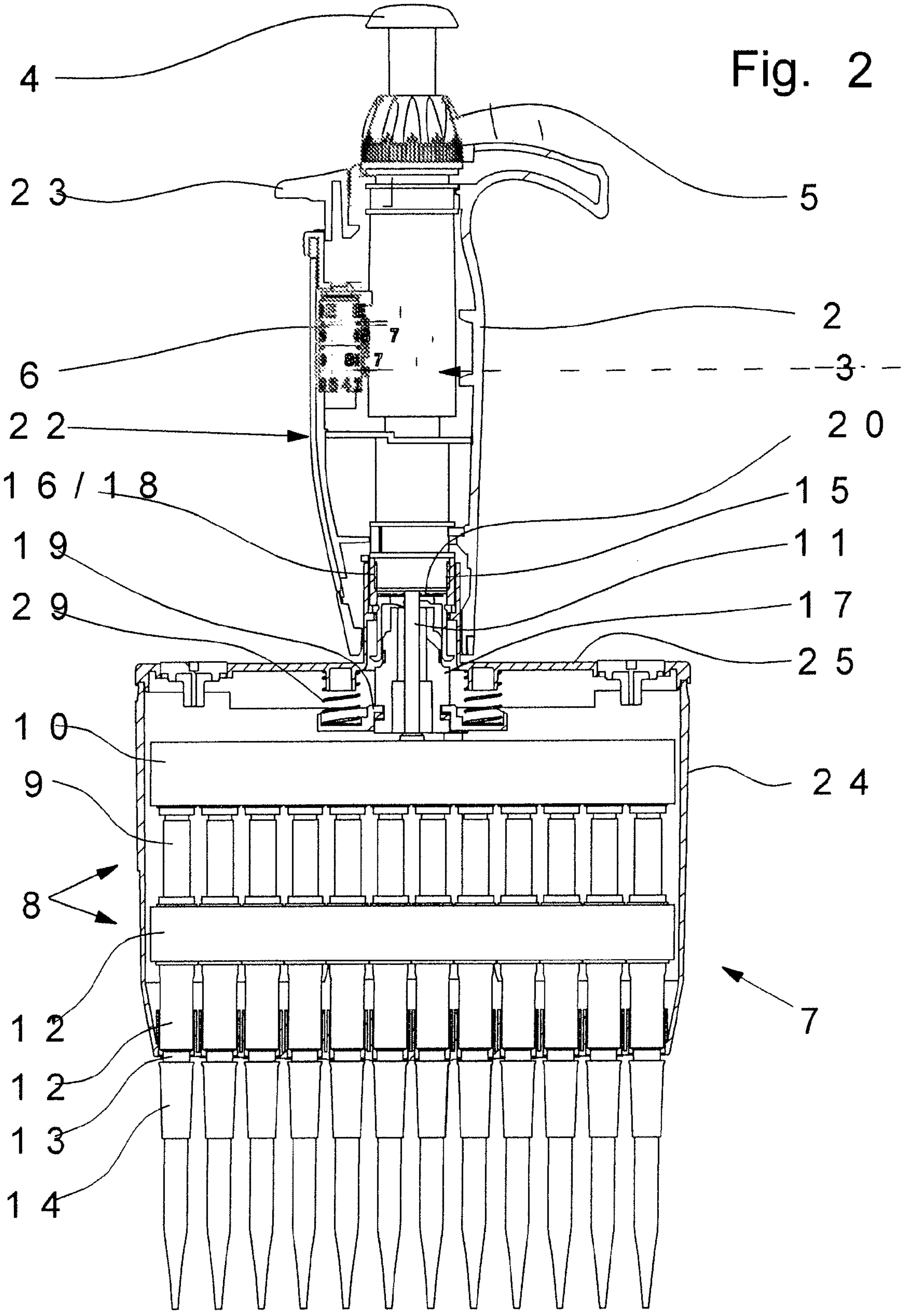
FIG. 2 shows the multichannel pipette from FIG. 1 in vertical section.

FIG. 2 shows more of the interior of the grip part 2, in particular a mechanical display device 6 on the left. Further details are discussed below.

FIGS. 1 & 2, viewed together, also show a displacement part 7, which includes a plurality of cylinder/piston arrangements 8 disposed alongside one another. The pistons 9 of the cylinder/piston arrangements 8 are coupled to one another, preferably via a common piston bar 10, and, by actuation of the piston-driving device 3, more specifically by the piston-pushing rod 11 of FIG. 2, can jointly be pressed down counter to a spring force in FIG. 2. In this way, they can be moved relative to the likewise interconnected cylinders 12 of the piston/cylinder arrangements 8, which are coupled by means of a cylinder bar 12'.

At the lower end of the displacement part 7, FIG. 2 shows the shafts 13 of the cylinders 12 onto which plastic pipette tips 14 are exchangeably mounted. FIG. 1 shows the pipette tips 14 at the lower end of the displacement part 7 in a perspective view.

The grip part 2 is connected releasably to the displacement part 7. This is effected by a connection device, which leads to an axially rigid connection of the parts, but permits a rotation of the displacement part 7 relative to the grip part 2 about the longitudinal axis 1. FIG. 1 shows clearly that it is possible, adapted to the individual hold by a user, to alter the relative rotation position of the displacement part 7 with respect to the grip part 2. The user can thus at all times obtain a clear view of the wells of a microtiter plate.

Figure 3:
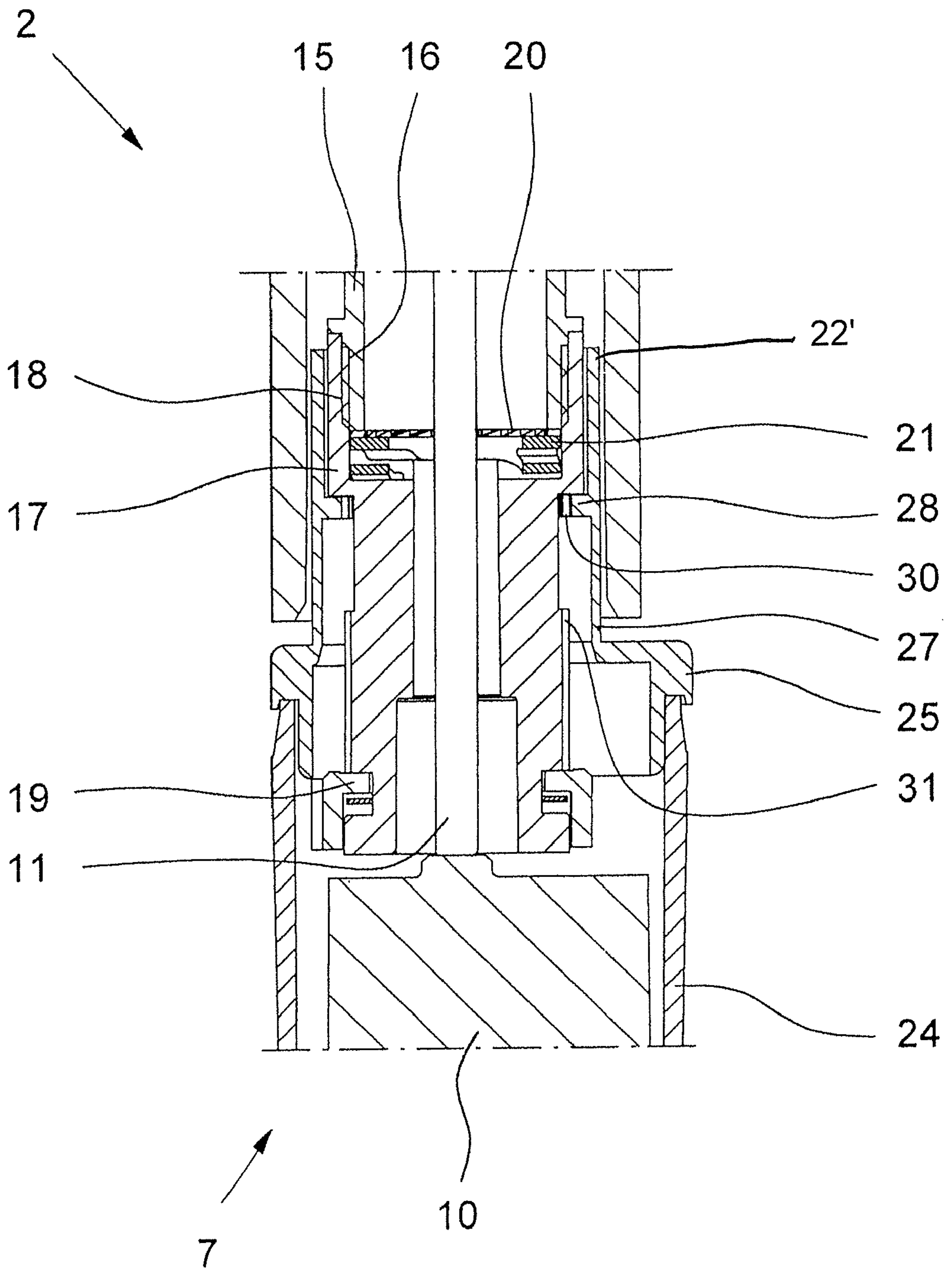
FIG. 3 shows the connection area between the grip part and the displacement part of the multichannel pipette according to FIG. 2, in a cross section turned through 90° relative to FIG. 2, without manual actuation.

To permit the detachability of grip part 2 and displacement part 7, the connection device includes a threaded connection element 16, arranged on a support part 15 of the grip part 2, and also a connection part 17 with a matching threaded element 18 in engagement with the threaded connection element 16. The threaded elements 16, 18 are indicated in FIG. 3.

The rotatability of the displacement part 7 relative to the grip part 2 about the longitudinal axis 1 is achieved by the displacement part 7 being mounted on the connection part 17, so as to rotate about the longitudinal axis 1. Except for clearance that is needed for this rotary bearing 19, the connection part 17 is connected in an axially fixed manner to the coupled cylinders 12 of the cylinder/piston arrangements 8, and therefore to the cylinder bar 12'.

When the displacement part 7 is mounted securely on the grip part 2 and is located in its end position, the threaded elements 16, 18 are completely in engagement with each other. When the displacement part 7 is rotated in the direction of screwing-in relative to the grip part 2, nothing changes in the threaded connection of the parts. Thus, the effective stroke of the piston-driving device 3 also remains unchanged. However, if the displacement part 7 is turned in the opposite direction relative to the grip part 2, then, in the event of a threaded connection due to it having come loose, it may happen that the displacement part 7 is not turned relative to the connection part 17 in the rotary bearing 19, but instead the displacement part 7 takes along the connection part 17, and the connection part 17 is then unscrewed from the support part 15 of the grip part 2 or at least loosened since the friction suitable for the thread has become less than the friction in the rotary bearing as noted in the Summary above.

The threaded elements 16, 18 are locked in a form-fit manner in the state when substantially completely screwed in. For this purpose, form-fit configurations 20 matching one another are provided, on the one hand, on the support part 15 and, on the other hand, on the connection part 17, and, when the threaded elements 16, 18 are substantially completely engaged, the form-fit configurations 20 engage with one another in such a way that they prevent a reverse rotation of the connection part 17 relative to the support part 15. However, the form-fit configurations 20 can be disengaged from one another by a manual release action, such that a reverse rotation of the connection part 17 relative to the support part 15 is possible. Although not depicted here, a manual release action can, for example, be effected by an additional manual release element on the grip part 2, for example, a slide, or a button that acts on the support part 15 or the connection part 17.

The rotary bearing 19 can also be blocked by the manual release action. The form-fit configurations 20 are disengaged from one another, indicated at the top of the connection part 17 in FIG. 2. Also, the rotary bearing 19 is at the same time bridged as it were, so that the connection part 17 is connected in a rotationally fixed manner to the displacement part 7. By holding the grip part 2 and turning the displacement part 7, the matching threaded element 18 on the connection part 17 can be unscrewed from the threaded connection element 16 on the support part 15.

Figure 4:
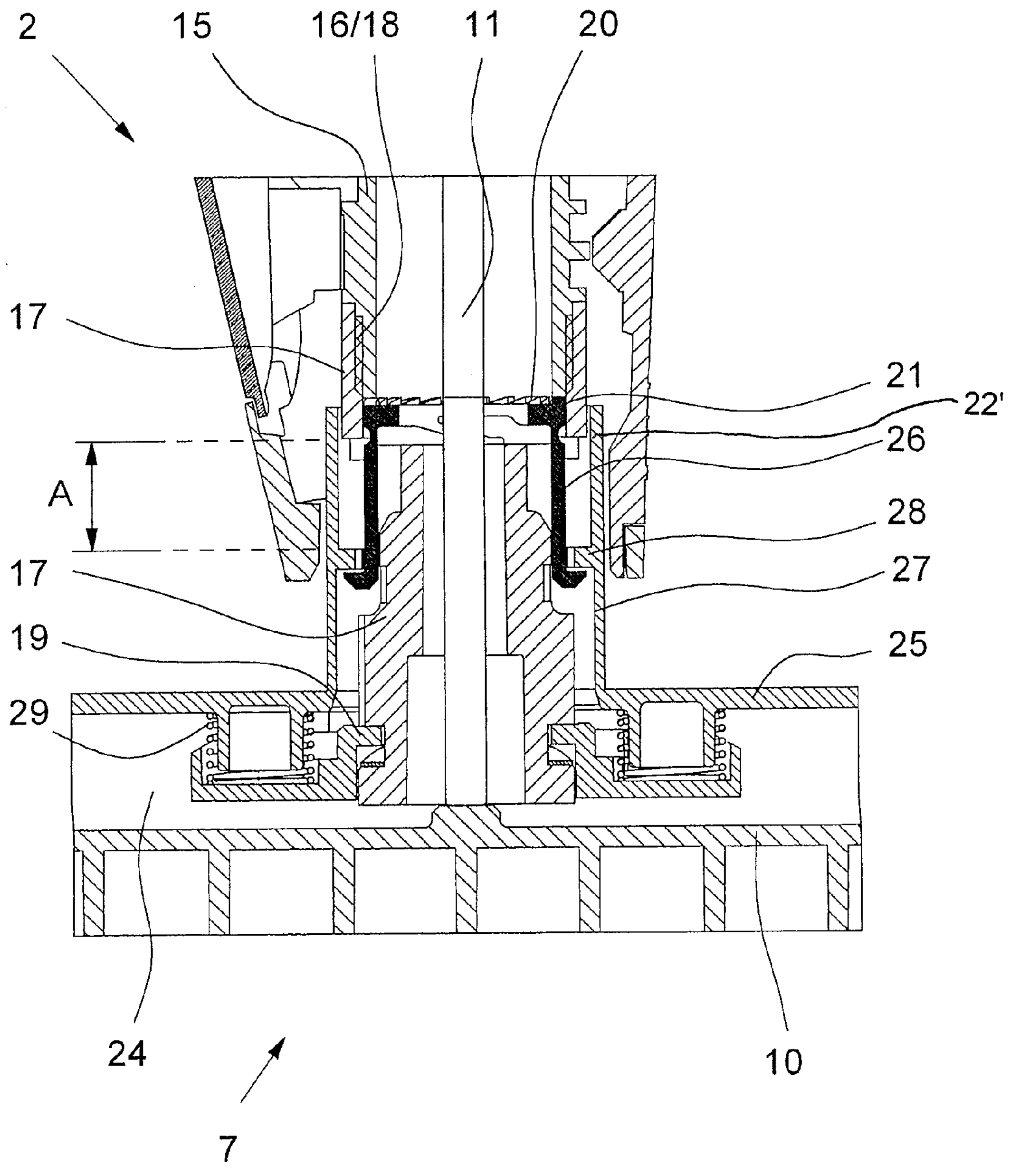
FIG. 4 shows a cross section in the same position as in FIG. 3, but turned through 90° relative to FIG. 3, and with manual actuation of an ejection mechanism.
Figure 5:
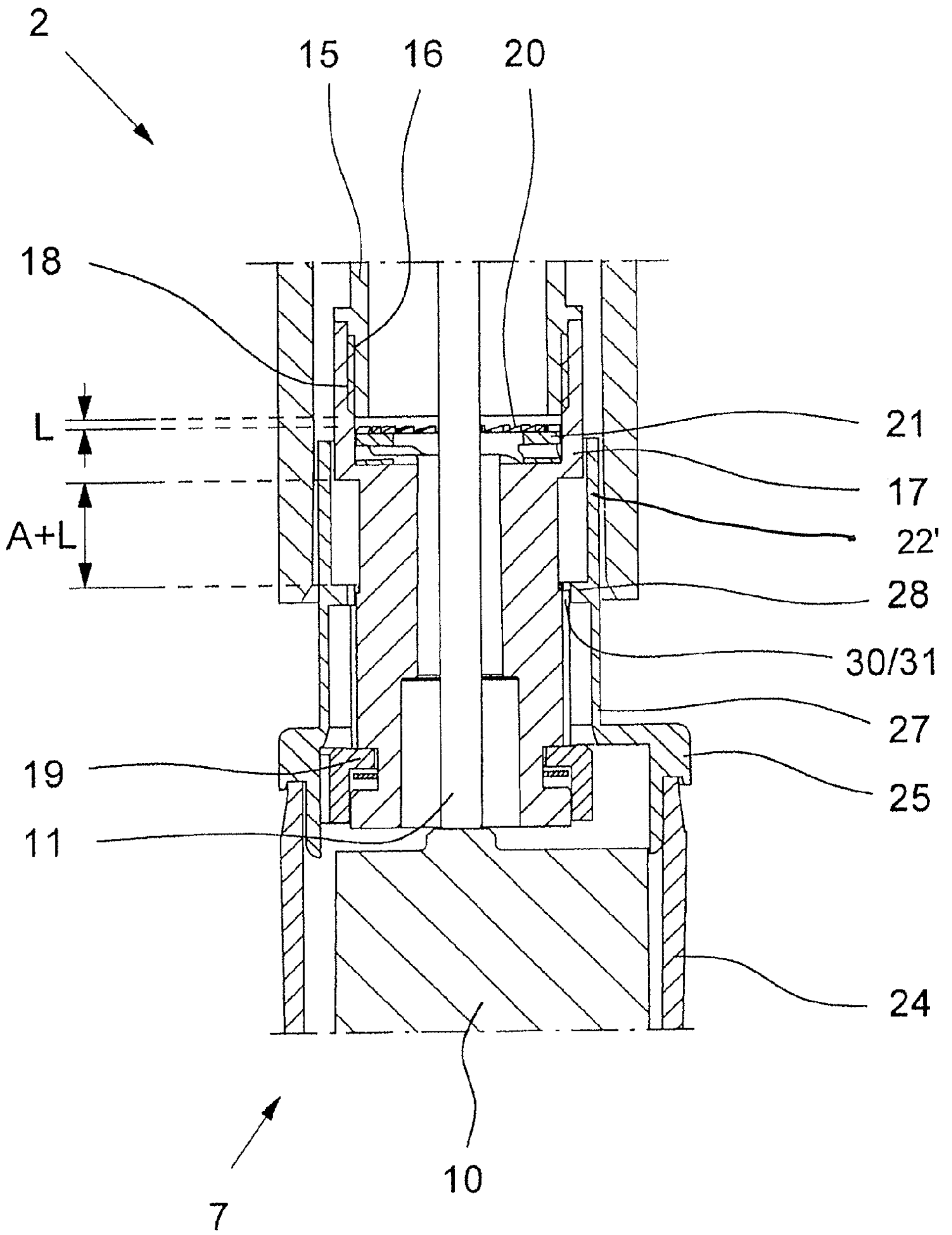
FIG. 5 shows the cross-sectional view from FIG. 3, in a position corresponding to FIG. 3, but with actuation of the ejection mechanism and a simultaneous manual release action.

FIGS. 3 to 5 show that the form-fit configurations 20 can be configured as locking lugs that are oriented in opposite directions to one another. FIG. 5 shows the locking lugs (form-fit configurations 20) only at the upper edge of the connection part 17. Form-fit configurations 20 are also provided at the lower edge of the support part 15 of the grip part 2, but for the sake of clarity are not shown. The form-fit configurations 20 on the two parts involved can be of identical or different configuration and number, and need only provide engagement with one another.

The form-fit configurations 20 have an asymmetrical design in a sawtooth shape. In this way, an asymmetrical wedge mechanism is created. During the rotation of the threaded elements 16, 18 in the direction of complete engagement on the last section of the travel, the wedge mechanism acts like a ratchet. In the same way, the mechanism prevents a reverse rotation shortly before the end position of the threaded elements 16, 18, but allows further rotation until the end position is reached.

The form-fit configurations 20 can be oriented axially. Accordingly, the movement of the form-fit configurations 20 with respect to one another also takes place in the axial direction when the manual release action is performed. This, advantageously, permits ergonomic handling of the multichannel pipette.

In principle, especially when using an independent actuation part, the form-fit configurations 20 can also be oriented radially or at a defined angle to the longitudinal axis 1. Corresponding structural solutions can be employed, as will be appreciated by those skilled in the relvant art(s).

The form-fit configurations 20, assigned to the support part 15, not shown separately in the view in FIG. 5, are arranged in a fixed position, and can be formed integrally on the plastic portion of the support part 15. FIGS. 3 to 6 show clearly the form-fit configurations 20 with the connection part 17 assigned to them. The form-fit configurations 20 are arranged on an additional catch element 21 that can be moved from a first position into a second position, and vice versa. If this catch element 21 is made of plastic, as is customary in most cases, these form-fit configurations 20 can also be integrally formed thereon. The form-fit configurations 20 can include a ring of asymmetrically designed sawtooth-shaped locking lugs, and which is formed integrally on the axially upper rim of the catch element 21. In addition, they can be configured as oppositely directed locking lugs provided on the axial, annular underside of the support part 15, for example, as four form-fit configurations 20 distributed about the circumference.

The catch element 21 is the transmission means for moving the form-fit configurations 20 relative to one another. By the manual release action, the catch element 21 can be moved into its second position, as a result of which the form-fit configurations 20 disengage. Thus, the catch element 21 can be moved axially and counter to a spring force from the position shown in FIG. 4 into the second position referred to in the preceding paragraph and shown in FIG. 5.

As previously noted, the pipette tips 14 are intended to be ejected from the shafts 13 of the cylinders 12 by a manual action. This is normally done using an axially adjustable ejection mechanism 22 on the grip part 2. An actuation button 23 can be seen in FIG. 1. In a cross section turned through 90° relative to FIG. 2, FIG. 3 shows an ejector sleeve 22' as part of the ejection mechanism 22 inside the grip part 2.

The desired manual release action for the form-fit configurations 20 can now also take place by means of the ejection mechanism 22, wherein the catch element 21 can be moved axially by means of the ejection mechanism 22, and explained in more detail below with reference to FIGS. 3 to 6.

In principle, the axial movement of the ejection mechanism 22 is optimally suited for the preferred axial movement of the catch element 21 as drive movement. The nature of the force transmission can be modified within wide limits and can be achieved using a different construction.

The outer housing 24 is part of the force transmission path from the actuation button 23 of the ejection mechanism 22 to the pipette tips 14 at the bottom of the displacement part 7 that surrounds the cylinder/piston arrangements 8 of the displacement part 7. The outer housing 24 is axially movable relative to the cylinder/piston arrangements 8, more specifically relative to their cylinders 12, which are held together by the cylinder bar 12'.

An outer housing 24 that is axially movable counter to a spring force can be used as an ejector for the pipette tips 14, as known in the prior art, for example, as shown in the above cited U.S. Pat. No. 5,021,217 and in U.S. Patent Application Publication 2007/0048193 A1. The outer housing 24, closed by a housing lid 25, can be moved by means of the ejection mechanism 22, counter to the spring force, over a defined ejection stroke A, as shown in FIG. 4. The catch element 21 can also be taken along axially by the outer housing 24, for example, in a release stroke L, as shown in FIG. 5, and following the ejection stroke A. In this way, it is possible to work quite normally with the ejection mechanism 22, without running any risk of the threaded elements 16, 18 accidentally being unlocked. The sum of ejection stroke A and release stroke L is also shown in FIG. 5.

Figure 6:
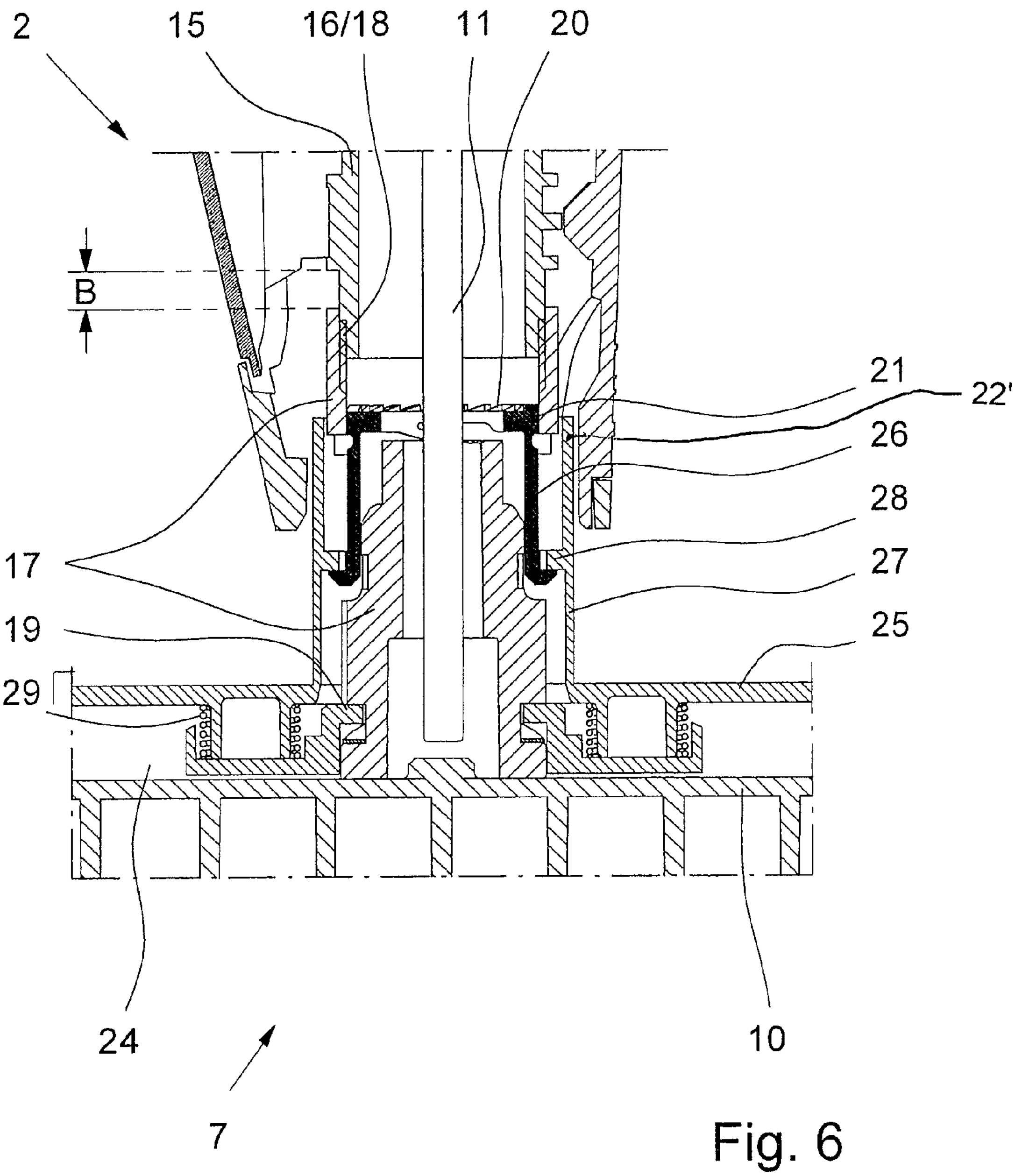
FIG. 6 shows the multichannel pipette in a cross-sectional position according to FIG. 4, with the displacement part now almost completely unscrewed.

If the actuation button 23 of the ejection mechanism 22 has been pressed down sufficiently, the form-fit configurations 20 disengage from one another, as a result of the function of the catch element 21. If the user holds the actuation button 23 in this position, the user can turn the outer housing 24 of the displacement part 7 in the release direction. In this state, the rotary bearing 19 is blocked and the connection part 17 is taken along, so that the matching threaded element 18 on the connection part 17 detaches itself from the threaded connection element 16 on the support part 15. The displacement part 7 can be removed from the grip part 2. FIG. 6 shows the arrangement in which this unscrewing movement has been almost completed, wherein the unscrewing travel B is shown.

The construction explained above also allows the unscrewing to be done by continuous pulling of the outer housing 24 of the displacement part 7 in the direction away from the grip part 2. Then, the actuation button 23 of the ejection mechanism 22 does not have to be kept permanently pressed down.

FIGS. 3 to 6 show an exemplary construction of the catch element 21 and the associated functionality. For this purpose, provision is made that the catch element 21 is designed as a cap with the form-fit configurations 20 at the upper end and with carrier arms 26 protruding downward therefrom, and that the outer housing 24 is provided with an upwardly protruding jacket 27, which encloses at least the carrier arms 26 of the catch element 21 from the outside, and which has inwardly protruding carriers 28 engaging with the carrier arms 26. These arrangements can be seen particularly clearly in the cross sections in FIGS. 4 and 6.

The jacket 27 is integrally formed on and protruding upward from the housing lid 25 of the outer housing 24 and carries the radially inwardly protruding carriers 28. The outwardly curved ends of the carrier arms 26 formed integrally on the catch element 21 engage under these carriers 28. Starting from the position in FIG. 4, the catch element 21 moves further down, because the carrier arms 26 are taken along downwardly by the carriers 28, when the housing lid 25 is pressed down counter to the force of the bearing springs 29. In this way, the form-fit configurations 20 at the upper edge of the catch element 21 disengage from one another.

The inwardly protruding carriers 28 on the jacket 27 are also used for blocking the rotary bearing 19 during the manual release action. For this purpose, inwardly protruding rotation-transmission ribs 30 are formed on the carriers 28, and opposite these, outwardly protruding rotation-transmission grooves 31 are formed on the connection part 17 at a considerable axial distance from the form-fit configurations 20. In FIG. 5, the catch element 21 has reached its second position, and the rotation-transmission ribs 30 are here in engagement with the rotation-transmission grooves 31. The jacket 27 and with it the outer housing 24 with the entire displacement part 7 are coupled directly via form fit to the connection part 17, so that the rotary bearing 19 is no longer active.

Rotation-transmission ribs 30 and rotation-transmission grooves 31 can be realized, for example, in the form of matching outer and inner teeth, and visa versa.

The catch element 21 is coupled to the connection part 17 fixedly in the direction of rotation, otherwise the form-fit configurations 20 could not come into action.

In FIGS. 4 and 6, a friction brake and/or ratchet brake is indicated on the rotary bearing 19, here in the form of a multi-step notching, by which the rotation of the displacement part 7 relative to the connection part 17 only takes place in a braked manner. In this way, the displacement part 7 cannot arbitrarily move relative to the grip part 2.

Most parts of the pipette are expediently produced from an injection-moldable theromoplastic, for example, from polypropylene reinforced with minerals, from ABS or polycarbonate. The spring elements can be made of other materials, in order to permanently retain the necessary spring forces, even under the conditions of frequent autoclaving. The improved multichannel pipette is particularly advantageous by virtue of the fact that it can be autoclaved in the assembled state.

What is claimed is:

1. A multichannel pipette, comprising:

a grip part that structurally defines a longitudinal axis and that includes a piston-driving device which is movable axially in the direction of the longitudinal axis;

a displacement part including a plurality of cylinder and piston arrangements disposed alongside one another; and a connection device by which the grip part is detachably connected to the displacement part, the connection being axially rigid, but permitting a rotation of the displacement part relative to the grip part about the longitudinal axis, wherein the connection device includes a threaded connection element arranged on a support part of the grip part, and a connection part having a matching threaded element in engagement with the threaded connection element, wherein the displacement part is mounted on the connection part so as to rotate about the longitudinal axis, wherein the cylinder and piston arrangements include pistons and interconnected cylinders, the pistons being coupled to one another, and are jointly movable axially relative to the interconnected cylinders by actuation of a piston-driving device provided, wherein the connection part is connected with the coupled cylinders of the cylinder and piston arrangements in an axially fixed manner and includes a clearance for a rotary bearing provided therein, wherein matching form-fit configurations are respectively provided on the support part and the connection part, wherein the threaded elements are substantially engaged with one another, wherein the form-fit configurations are in engagement with one another in such a way that they prevent a reverse rotation of the connection part relative to the support part, and wherein, by a manual release action, the form-fit configurations are disengaged from one another, so that the connection part rotates in a reverse rotation relative to the support part.

2. The pipette of claim 1, wherein the rotary bearing is blocked by the manual release action.

3. The pipette of claim 1, wherein the form-fit configurations are configured as locking lugs oriented in opposite directions relative to one another.

4. The pipette of claim 1, wherein the form-fit configurations are configured asymmetrically, in a sawtooth shape, permitting a rotation of the connection part relative to the support part.

5. The pipette of claim 1, wherein the form-fit configurations are oriented axially.

6. The pipette of claim 1, wherein the form-fit configurations of the support part are arranged to be stationary and are integrally formed, wherein the form-fit configurations of the connection part are integrally formed on a catch element which moves back and forth from a first position to a second position relative to the connection part, and wherein the catch element moves into the second position by the manual release action to disengage the form-fit configurations.

7. The pipette of claim 6, wherein the catch element moves axially.

8. The pipette of claim 7 wherein the displacement part includes an outer housing which surrounds the cylinder and piston arrangement and which is axially movable relative to the cylinder and piston arrangement, wherein a spring is provided to pretension the outer housing axially against the grip part, and by means of the manual release action, the outer housing moves counter to a spring force of the spring along a defined first stroke, and wherein the catch element is taken along axially by the outer housing, in a second, release stroke, subsequent to the first stroke.

9. The pipette of claim 8, wherein the catch element is moved by pulling the outer housing axially in the direction away from the grip part.

10. The pipette of claim 9, wherein the catch element is configured as a cap with the form-fit configurations at an upper end thereof and with carrier arms provided protruding downward therefrom, and wherein the outer housing is provided with an upwardly protruding jacket which encloses at least the carrier arms of the catch element and has inwardly protruding carriers that engage with the carrier arms.

11. The pipette of claim 6, wherein the displacement part includes an outer housing which surrounds the cylinder and piston arrangement and which is axially movable relative to the cylinder and piston arrangement, wherein a spring is provided to pretension the outer housing axially against the grip part, and by means of the manual release action, the outer housing moves counter to a spring force of the spring along a defined first stroke, and wherein the catch element is taken along axially by the outer housing, in a second, release stroke, subsequent to the first stroke.

12. The pipette of claim 1, wherein the displacement part includes an outer housing which surrounds the cylinder and piston arrangement and which is axially movable relative to the cylinder and piston arrangement, wherein a spring is provided to pretension the outer housing axially against the grip part, and by means of the manual release action, the outer housing moves counter to a spring force of the spring along a defined stroke, and wherein a catch element is provided and which is taken along axially by the outer housing, in a release stroke, subsequent to the stroke.

13. The pipette of claim 12, wherein the catch element is moved by pulling the outer housing axially in the direction away from the grip part.

14. The pipette of claim 13, wherein the catch element is configured as a cap with the form-fit configurations at an upper end thereof and with carrier arms provided protruding downward therefrom, and wherein the outer housing is provided with an upwardly protruding jacket which encloses at least the carrier arms of the catch element and has inwardly protruding carriers that engage with the carrier arms.

15. The pipette of claim 12, wherein the catch element is configured as a cap with the form-fit configurations at an upper end thereof and with carrier aims provided protruding downward therefrom, and wherein the outer housing is provided with an upwardly protruding jacket which encloses at least the carrier arms of the catch element and has inwardly protruding carriers that engage with the carrier arms.

16. The pipette of claim 15, wherein the rotary bearing is blocked by the manual release action, wherein the form-fit configurations of the support part are arranged to be stationary and are integrally formed, wherein the form-fit configurations of the connection part are integrally formed on a catch element, which moves back and forth from a first position to a second position relative to the connection part, wherein the catch element is movable into the second position by the manual release action to disengage the form-fit configurations, wherein inwardly protruding rotation-transmission ribs are formed on the inwardly protruding carriers of the jacket, wherein outwardly protruding rotation-transmission grooves are formed on the connection part, at an axial distance from the form-fit configurations, and wherein the rotation-transmission grooves are in engagement with the rotation-transmission ribs when the catch element is located in the second position.

17. The pipette of claim 16, wherein the rotary bearing includes at least one of an integrated friction brake and a ratchet brake configured so that the rotation of the displacement part relative to the connection part takes place with braking.

18. The pipette of claim 16, wherein the pipette is configured to be autoclaved in an assembled state.

19. The pipette of claim 1, wherein the rotary bearing includes at least one of an integrated friction brake and a ratchet brake configured so that the rotation of the displacement part relative to the connection part takes place with braking.

20. The pipette of claim 1, wherein most of the parts of the pipette are made of a thermoplastic.

21. The pipette of claim 16, wherein most of the parts of the pipette are made of a thermoplastic.

22. The pipette of claim 1, wherein the pipette is configured to be autoclaved in an assembled state.

* * * * *